United States Patent [19]
Poll et al.

[11] Patent Number: 4,851,496
[45] Date of Patent: Jul. 25, 1989

[54] MOLDING MATERIAL COMPRISING A THERMOTROPIC, AROMATIC POLYESTER FROM BIS(CARBOXY PHENOXY)DIPHENYL SULFONE

[75] Inventors: Heinz-Guenter Poll, Hilden; Wolfgang Neugebauer, Marl; Martin Bartmann, Recklinghausen; Juergen Finke, Marl, all of Fed. Rep. of Germany

[73] Assignee: Huels Aktiengesellschaft, Marl, Fed. Rep. of Germany

[21] Appl. No.: 240,517

[22] Filed: Sep. 6, 1988

[30] Foreign Application Priority Data

Dec. 12, 1987 [DE] Fed. Rep. of Germany ....... 3742205

[51] Int. Cl.$^4$ .............................................. C08G 69/28
[52] U.S. Cl. ..................................... 528/173; 528/171; 528/128; 528/190; 528/193
[58] Field of Search ...................... 528/171, 173, 128

[56] References Cited

U.S. PATENT DOCUMENTS 4,749,768  6/1988  Finke et al. ......................... 528/173
4,762,906  8/1988  Hisgen et al. ....................... 528/173

Primary Examiner—Harold D. Anderson
Assistant Examiner—T. Mason
Attorney, Agent, or Firm—Oblon, Spivak, McClelland, Maier & Neustadt

[57] ABSTRACT

A molding material, comprising the following monomer units:
(A) 10–80 mole % HO—AR—COOH,
(B) 0–40 mole % HOOC—Ar'—COOH,
(C) 10–45 mole % HO—Ar''—OH, and
(D) 5–45 mole %

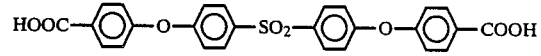

wherein Ar, Ar', and Ar'', independently, are 1,3- or 1,4-phenylene; 1,4-, 1,5-, 2,6- or 2,7-naphthylene or

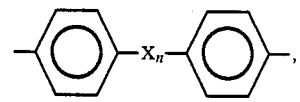

wherein X is —O—, —S—, —SO$_2$— or —CR$_2$—, R is H or C$_{1-4}$ alkyl, and n is 0 or 1, wherein all monomer unit quantities relate to the sum of components A-D and their sum is 100 mol %, and wherein the molar ratio (B+D):C ranges from about 0.9:1 to 1.1:1.

11 Claims, No Drawings

MOLDING MATERIAL COMPRISING A THERMOTROPIC, AROMATIC POLYESTER FROM BIS(CARBOXY PHENOXY)DIPHENYL SULFONE

BACKGROUND OF THE INVENTION

1. Field of the Invention

The present invention is related to molding materials consisting of a thermotropic, aromatic polyester.

2. Discussion of the Background

Thermotropic, aromatic polyesters comprising terephthalic acid, isophthalic acid, p-hydroxybenzoic acid and bisphenols are known (DE-OS No. 20 25 971). The melting points of the polyesters described in this reference are generally above 300° C., and may be even above 400° C. Such polyesters cannot be readily processed.

In addition to prior known initial monomers, polyesters with improved processability comprise e.g. benzophenonedicarboxylic acid (DE-OS No. 34 27 886) or dihydroxybenzophenone (DE-OS No. 34 15 530). However, the thermal stability of the molding materials prepared according to these references is not satisfactory.

Polyesters, which contain sulfone group-containing starting materials, are known from EP-PS No. 0 081 900. However, the patent specification discloses such a broad range of these starting materials that it is impossible to recognize especially advantageous proportions of the materials. Moreover, DE-OS No. 35 42 778 describes fully aromatic, mesomorphic polyether esters in which, among others, 4,4'-di(p-hydroxyphenoxy)-diphenylsulfone was used as monomer, but which cannot be obtained free of oligomers.

A need continues to exist for readily processable, aromatic polyesters having high chemical resistance.

SUMMARY OF THE INVENTION

Accordingly, one object of the present invention is to provide a readily processable aromatic polyester which has high chemical resistance.

This and other objects which will become apparent from the following specification have been achieved by the present molding material which comprises a thermotropic aromatic polyester comprising the following monomer units:

(A) 10–80 mole% HO—Ar—COOH
(B) 0–40 mole% HOOC—Ar'—COOH
(C) 10–45 mole% HO—Ar"—OH
(D) 5–45 mole%

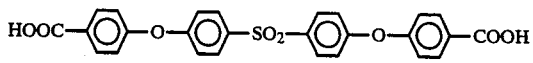

wherein Ar, Ar', Ar", independently denote 1,3- or 1,4-phenylene; 1,4-, 1,5-, 2,6- or 2,7-naphthylene or

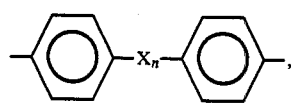

and X is —O—, —S—, —$SO_2$ or —$CR_2$; R is H, $C_{1-4}$ alkyl; and n=0 or 1; wherein all quantities relate to the sum of components A-D, and the sum is 100 mole%, and wherein the molar ratio of (B+D):C ranges from about 0.9:1 to 1.1:1.

Preferred as the aromatic hydroxycarboxylic acid (component A) are p-hydroxybenzoic acid, m-hydroxybenzoic acid, 1,4- or 2,6-hydroxynaphthoic acid.

Isophthalic acid, terephthalic acid, 1,4-, 1,5-, 2,6-, 2,7-naphthalenedicarboxylic acid, 4,4'-diphenyletherdicarboxylic acid, 4,4'-benzophenonedicarboxylic acid or mixtures thereof are preferred for use as the aromatic dicarboxylic acid (component B).

The following compounds are preferably used as the aromatic dihydroxy compound (component C.): hydroquinone, resorcinol, 1,3-, 1,4-, 1,5-, 2,6-, 2,7-dihydroxynaphthalene, 4,4'- or 3,4'-dihydroxybiphenyl, 4,4'- or 3,4'-dihydroxydiphenyl ether, 4,4'-dihydroxydiphenyl sulfone or mixtures thereof.

Preferably p-hydroxybenzoic acid, iso- and/or terephthalic acid, hydroquinone, 4,4'-dihydroxybiphenyl, and 4,4'-bis-(4-carboxyphenoxy)-diphenylsulfone are used.

Component A is preferably used in quantities ranging from about 30 to 70 mole%; component B, in quantities ranging from about 5 to 25 mole%; component C, in quantities ranging from about 15 to 35 mole%; and component D, in quantities ranging from about 10 to 25 mole%.

In a preferred embodiment, polyesters are used in which the molar ratio of the components B:D ranges from about 1:2 to 2:1. The molar ratio of (B+D):C preferably ranges from about 0.9:1 to 1.1:1.

Provided no other quantity is explicitly indicated, the quantities of the single components relate to the sum of the components A to D. At the same time their sum must equal 100 mole%.

The polyesters exhibit a reduced viscosity ($\eta_{red}$) of at least 0.5 dl/g, preferably of at least 1.0 dl/g.

The preparation of thermotropic aromatic polyesters is basically known (Polymer 15, 527 (1974); Polymer 27, 441 (1986).

The reaction takes place in two steps. First, a transesterification or esterification is carried out, then a polycondensation follows. The polycondensation can be carried out in the absence or also in the presence of catalysts.

When catalysts are used, they are used in quantities from 0.001 to 0.5% by weight, preferably from 0.01 to 0.1% by weight, with respect to the sum of the monomers. Suitable catalysts are for example alkali- or alkaline earth acetates, zinc acetate, manganese acetate, germanium dioxide, antimony trioxide, organotin compounds, as well as titanium and zirconium alcoholates. The catalysts are known as such and described for example in V. V. Korshak and S. Vinogradova, Polyesters, Pergamon Press (1965).

The polyesters may contain known branching agents such as trimesic acid, pyromellitic acid or trihydroxybenzene, for example.

The molding materials are prepared according to methods known in the art. Thus for example the polyester is melted in an injection molding machine and injected into a mold.

In addition to the thermotropic aromatic polyesters, the molding materials may contain the usual auxiliary agents and additives such as pigments, ultraviolet stabilizers, antioxidants, other stabilizers, fillers, etc.

The molding materials can be processed according to the conventional procedures such as injection molding and extrusion, among others, into molded parts, fibers, and films etc.

The molded materials of the invention have surprisingly good chemical resistance with simultaneously excellent processability.

The reduced viscosity ($\eta_{red}$) is determined with a solution of polyester in phenol/o-dichlorobenzene 50/50 (5 g/l) at 25° C.

The glass transition temperature (Tg) and the melting point (Tm) are determined by means of DSC at a heating rate of 10° C./min.

Other features of the invention will become apparent in the course of the following descriptions of exemplary embodiments which are given for illustration of the invention and are not intended to be limiting thereof.

EXAMPLES

Example 1

15.70 g of 4.4'-bis(p-carboxyphenoxy)diphenyl sulfone (32.00 mmol), 6.28 g of hydroquinone diacetate (32.3 mmol), 5.77 g of p-acetoxybenzoic acid (32.00 mmol) and 0.028 g of amorphous germanium dioxide were stirred together under a nitrogen atmosphere with simultaneous distillation of acetic acid which formed for 30 min each at 260° C., 280° C., 300° C. and 320° C. After cooling, the precondensate obtained was pulverized and recondensed in the solid phase at 0.5 torr (30 min at 200° C., 4 hours at 260° C. and 4 hours at 280° C.) to give a product with the following properties: $\eta_{red}$=0.74 dl/g, Tg=156° C.; Tm=306° C. Under light polarizing microscope with crossed polarizers of 306° to 344° C. the melt showed a schlieren texture, which is typical for nematic phases.

Example 2

24.53 g of 4.4'-bis(p-carboxyphenoxy)diphenyl sulfone (50.0 mmol), 9.31 g of dihydroxybiphenyl (50.0 mmol), 20.72 g of 4-hydroxybenzoic acid (150.0 mmol) and 35.73 g of acetic anhydride (350.0 mmol) were heated under nitrogen to 260° C. The mixture was stirred for 30 min at 260° C., then for 15 min at 280° C., 15 min at 300° C. and 15 min at 320° C., whereby the last residues of acetic anhydride and acetic acid are removed by means of distillation. To complete the reaction a vacuum was attached at 320° C. (1 mbar). After 1 hour, the nitrogen flow was stopped and the melt removed yielding a product having $\eta_{red}$=1.44 dl/g, Tg=154° C.; Tm=302° C. Under the polarizing microscope with crossed polarizers of 302° to 385° C. (measurement limit), the melt showed a schlieren texture which is typical for nematic phases.

At 330° C. the polyester could be molded into a panel. The panel showed no changes after a seven day storage in methylene chloride.

Examples 3 to 8

Polyesters were prepared in accordance with Example 2. The compositions and the properties are listed in the table.

TABLE

| Example | Composition | Mole % | $T_g$ (°C.) | $T_m$ (°C.) | $\eta_{red}$ (dl/g) |
|---|---|---|---|---|---|
| 3 | ESCA:Hy:PHB | 16.7:16.7:66.7 | 159 | 332 | 1.47 |
| 4 | ESCA:Hy:PHB | 20:20:60 | 150 | 320 | 1.18 |
| 5 | ESCA:Hy:PHB | 25:25:50 | 143 | 302 | 1.78 |
| 6 | ESCA:DHB:MHB | 20:20:60 | 188 | 282 | 1.02 |
| 7 | ESCA/IS/TS:Hy:PHB | 5/15/5:25:50 | 139 | 287 | — |
| 8 | ESCA/IS:Hy:PHB | 7.5/17.5:25:50 | 145 | 262 | — |

ESCA: 4,4'-bis-(4-carboxyphenoxy)diphenylsulfone
Hy: hydroquinone
PHB: p-hydroxybenzoic acid
DHB: 4,4'-dihydroxybiphenyl
MHB: m-hydroxybenzoic acid
IS: isophthalic acid
TS: terephthalic acid
—: insoluble in phenol/o-dichlorobenzene Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding material, comprising the following monomer units:
   (A) 10–80 mole% HO—AR—COOH,
   (B) 0–40 mole% HOOC—Ar'—COOH,
   (C) 10–45 mole% HO—Ar''—OH, and
   (D) 5–45 mole%

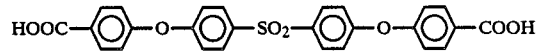

wherein Ar, Ar', and Ar'', independently, are 1,3- or 1,4-phenylene; 1,4-, 1,5-, 2,6- or 2,7-naphthylene or

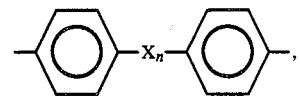

wherein X is —O—, —S—, —SO$_2$— or —CR$_2$—, R is H or C$_{1-4}$ alkyl, and n is 0 or 1, wherein all monomer unit quantities relate to the sum of components A–D and their sum is 100 mole%, and wherein the molar ratio (B+D):C ranges from about 0.9:1 to 1.1:1.

2. The molding material of claim 1, wherein component D comprises at least 20 mole% of the sum of components B and D.

3. The molding material of claim 1, wherein component D comprises at least 30 mole% of the sum of components B and D.

4. The molding material of claim 1, wherein said polyester has a reduced viscosity of at least 0.5 dl/g.

5. The molding material of claim 1, wherein component A is selected from the group consisting of p-hydroxybenzoic acid, m-hydroxybenzoic acid, 1,4-hydroxynaphthic acid, and 2,6-hydroxynaphthic acid.

6. The molding material of claim 1, wherein component B is selected from the group consisting of isophthalic acid, terephthalic acid, 1,4-, 1,5-, 2,6-, and 2,7-naphthylenedicarboxylic acid, 4,4'-diphenyletherdicarboxylic acid, 4,4'-benzophenonedicarboxylic acid, and mixtures thereof.

7. The molding material of claim 1, wherein component C is selected from the group consisting of hydroquinone, resorcinol, 1,3-, 1,4-, 1,5-, 2,6- and 2,7-dihydroxynaphthylene, 4,4'- and 3,4'-dihydroxybiphenol, 4,4'- and 3,4'-dihydroxydiphenol ether, 4,4'-dihydroxydiphenol sulfone and mixtures thereof.

8. The molding material of claim 1, wherein Ar is 1,4-phenylene.

9. The molding material of claim 1, wherein Ar' is 1,3- or 1,4-phenylene or mixtures thereof.

10. The molding material of claim 1, wherein Ar" is 1,4-phenylene, 4,4'-biphenylene or mixtures thereof.

11. The molding material of claim 1, wherein the molar ratio of components B:D ranges from about 1:2 to 2:1.

* * * * *